United States Patent [19]

Chacour et al.

[11] 4,331,314
[45] May 25, 1982

[54] HYDRAULIC PUMP/TURBINE DISCHARGE RING SUPPORT ANCHORAGE

[75] Inventors: Selim A. Chacour; Calvin W. Rudacille, both of York, Pa.

[73] Assignee: Allis-Chalmers Corporation, Milwaukee, Wis.

[21] Appl. No.: 152,169

[22] Filed: May 22, 1980

[51] Int. Cl.³ .............................................. F16M 7/00
[52] U.S. Cl. .................................. 248/679; 248/680; 248/188.4
[58] Field of Search ............... 248/679, 680, 681, 650, 248/653, 656, 188.4

[56] References Cited

U.S. PATENT DOCUMENTS

| | | | |
|---|---|---|---|
| 3,361,410 | 1/1968 | Messer | 248/188.4 |
| 3,512,738 | 5/1970 | Galbarini et al. | 248/679 X |
| 3,658,438 | 4/1972 | Coleman et al. | 248/679 |
| 3,669,393 | 6/1972 | Paine | 248/188.4 |
| 4,029,275 | 6/1977 | Erismann | 248/680 |
| 4,061,298 | 12/1977 | Kuber | 248/650 |

Primary Examiner—Dave W. Arola
Attorney, Agent, or Firm—Robert C. Jones

[57] ABSTRACT

A hydraulic pump/turbine discharge ring leveling, supporting and anchoring apparatus is disclosed which includes a prestressed anchor stud (21) connected between an upper foundation ring (28) and a flange portion (17') of a pump/turbine discharge ring (14) to secure the discharge ring (14) to the upper foundation ring (28). Prior to prestressing the anchor stud (21), a jack-bolt (43) mounted beneath the flange portion (17') is moved upwardly into engagement with the flange portion (17') of the discharge ring (14) to effect a leveling of the discharge ring (14). Thereafter the anchor stud (21) is prestressed by turning down a nut (54) engaging an end of the stud (21) projecting upwardly through the flange portion (17') of the discharge ring (14). The upper foundation ring (28) is anchored to a lower foundation ring (22) embedded in a concrete foundation structure (12), by a plurality of prestressed anchor bolts (23) each extending through the upper foundation ring (28), through a sleeve (24) between the upper and lower foundation rings (28, 22) and through the lower foundation ring (22). The sleeves (24) are also embedded in the concrete foundation structure and have an internal diameter larger than the outer diameter of the anchor bolts (23).

2 Claims, 2 Drawing Figures

HYDRAULIC PUMP/TURBINE DISCHARGE RING SUPPORT ANCHORAGE

BACKGROUND OF THE INVENTION

In a high head pump/turbine the discharge ring is one of the most critical of all of the pump/turbine components. This has been established by a systematic analysis of the field experience involving foundation shifting and distributor height growth reported on a number of installations of different manufacture. In order to better understand the interaction between the stay ring 16, the discharge ring 14 and foundation 12, the discharge ring 14 is shown, in FIG. 1, as isolated with force components acting thereon as indicated. As indicated, the force arrow Z is the sum of the vertical loads acting on the discharge ring wetted surfaces. In the design, shown in FIG. 1, only the sole rings A and B transfer the vertical loads from the discharge ring 14 to the foundation 12. Analysis has shown that force Z is reacted by approximately 0.4Z on the inner sole ring portion A and by approximately 0.6Z on the outer sole ring portion B. The head cover (not shown) vertical load, which is approximately equal to the vertical force Z, is superimposed at the discharge ring to a discharge ring flange 17 resulting in a final vertical upward reaction of a force of 0.4Z at the inner sole ring A and also at the outer sole ring B. The magnitude of these forces for different operating conditions, even for these reduced loads, are of such magnitude as to require very careful anchorage.

OBJECTS AND SUMMARY OF THE INVENTION

It is an object of the invention to efficiently transfer the substantial loads generated by the hydraulic pressure to the foundation.

It is another object of the invention to provide an improved anchorage and leveling concept for pump/turbines.

Still another object of the invention is to provide an improved anchorage and leveling concept for the discharge ring of a pump/turbine which is tied to the foundation.

In accordance with the present invention, the aforesaid objects are achieved by a hydraulic pump/turbine discharge ring leveling, supporting and anchoring apparatus which includes a prestressed anchor stud connected between an upper foundation ring and a flange portion of a pump/turbine discharge ring. The anchor stud functions to secure the discharge ring to the upper foundation ring. Prior to prestressing the anchor stud, a jack-bolt mounted beneath the flange in a vertically adjustable position, is moved upwardly into engagement with the under side of the flange portion of the discharge ring to effect a leveling of the discharge ring. Thereafter the anchor stud is prestressed by turning down a nut engaging an end of the stud projecting upwardly through the flange of the discharge ring to capture the discharge ring between the top of the jack-bolt and the upper end of the anchoring stud. The upper foundation ring is in turn anchored to a lower foundation ring embedded in a concrete foundation structure, by a plurality of prestressed anchor bolts each extending through the upper foundation ring, through a sleeve between the upper and lower foundation rings and through the lower foundation ring. The sleeves have an internal diameter larger than the outer diameter of the anchor bolts to thereby provide for limited movement of the pump/turbine discharge ring and the anchor bolts relative to the sleeves and concrete foundation structure, without relieving the prestress applied to the discharge ring leveling anchor stud or the prestress applied to the foundation ring anchor bolts; and also provide for level adjustment of the turbine discharge ring without relieving the prestress applied to the foundation ring anchor bolts.

DESCRIPTION OF THE INVENTION

Figure 2:
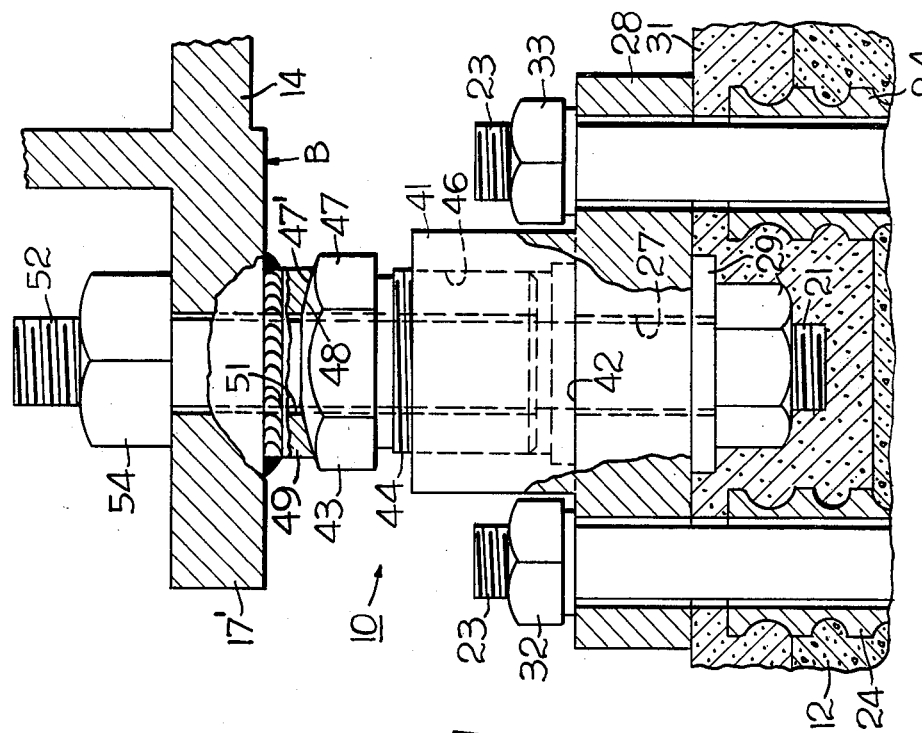
FIG. 2 is an enlarged fragmentary view partly in section and partly in elevation of an anchorage arrangement shown in FIG. 1.
Figure 1:
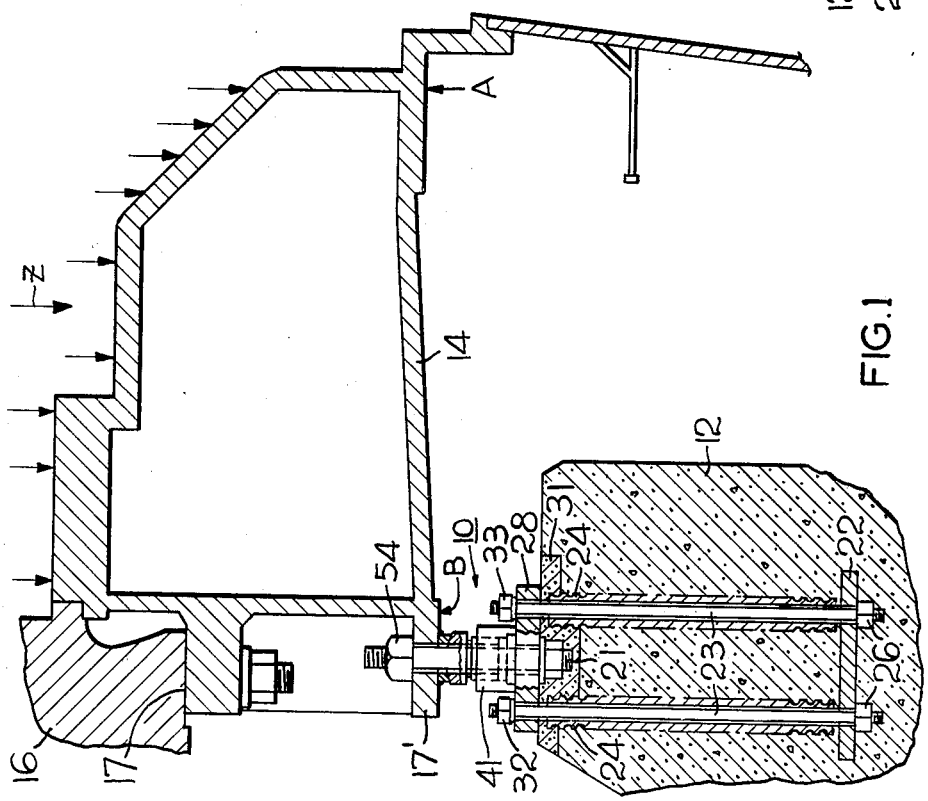
FIG. 1 is a fragmentary view in section through a portion of a pump/turbine discharge ring and a supporting foundation in which the present invention is incorporated.

As shown in FIG. 1, the support anchorage 10 is shown in relation to a support foundation 12 and a discharge ring 14 of a pump/turbine machine. A stay ring 16 is shown supported on a a discharge ring flange 17 of the discharge ring 14. Transfer of the substantial loads generated by the hydraulic pressure to the foundation 12 is by operation of a plurality of anchorages of which only the single anchorage 10 is shown. All support anchorages utilizes are identical to the anchorage 10.

As shown, the support anchorage assemblage 10 permits accurate prestressing and leveling of the discharge ring 14 and in addition has the requisite load transfer capability. The support anchorage 10 includes a threaded anchorage stud 21 which is secured to a lower foundation ring 22, FIG. 1, by operation of a plurality of anchorage bolts 23. Corrugated bolt sleeves 24 are set in the foundation 12 and provide free passage of the anchor bolts 23 and also permitting limited radial positioning movement of the bolts. The lower ends of the anchor bolts 23 pass through suitable openings in the lower foundation ring 22 and are connected thereto by nuts 26. The lower end of the anchorage stud 21 extends through a suitable opening 27 formed in an upper foundation ring 28. A nut and washer combination 29 connects the anchorage stud 21 to the upper foundation ring 28. The upper foundation ring 28 is provided with anchor bolt openings to allow the anchor bolts 23 to extend through the ring 28. The upper foundation ring 28 is leveled and grouted as at 31 to the upper surface of the foundation 12. After the grout 31 has set, the anchor bolts are prestressed by means of nuts 32 and 33, so that the upper foundation ring is secured in substantially unyielding relationship to the foundation. It is to be appreciated that the upper foundation ring 28 is extremely large and in the particular showing the complete ring 28 is about 30 feet in diameter. It will also be noted the anchorage assemblies 10 utilized in the particular installation will be forty in number, equally spaced around the ring, provide the necessary leveling effect and transfer of the substantial loads generated by the hydraulic pressure to the foundation.

A round nut 41 having a threaded bore, the diameter of which is substantially greater than the diameter of the anchor stud 21, is disposed about the anchor stud 21 and abuts the upper surface 42 of the upper foundation ring 28. A jack-bolt 43 having a lower threaded portion 44 is threadedly engaged in the threaded bore 46 of the round nut 41. The upper end of the jack-bolt 43 is provided with a hex head portion 47 to accommodate a wrench for adjusting purposes. The top surface 47' of the jack-bolt 43 presents a convex spherical surface which is adapted to mate with a concave spherical surface 48 formed on a jack-bolt washer 49. An axial bore 51 in the jack-bolt washer 49 provides for the passage of the anchorage stud 21 so that its upper threaded end 52 will extend above the upper surface of the discharge ring flange 17'. As shown, the jack-bolt washer 49 is welded to the under surface of the discharge ring flange 17'.

Jack-bolt 43 may be moved axially in either direction as required by application of a wrench to the hex head portion 47 of the jack-bolt, as required to effect a desired leveling operation of the discharge ring. By providing the mating spherical surfaces 47' and 48 on the jack-bolt head 47 and the jack-bolt washer 49, any misalignment of the components will be adjusted for automatically.

With leveling accomplished by operation of the anchorage assemblies 10, a nut 54 threaded on the extending end 52 of anchor stud 21 is tightened on the flange 17' to effect prestressing of the anchor stud 21 and capturing the discharge ring flange 17' between the jack-bolt 43 and the nut 54 to securely lock the flange in an adjusted level position.

The embodiments of the invention in which an exclusive property or privilege is claimed are defined as follows:

1. A leveling, supporting and anchoring apparatus for a discharge ring (14) of a hydraulic pump/turbine and the like, comprising: a concrete foundation structure (12); a pair of vertically spaced and aligned foundation rings (22, 28) with an upper of said rings (28) supported on top of said concrete foundation structure (12) and a lower of said rings (22) embedded in said concrete foundation structure (12); a threaded anchor stud (21) secured to the upper of said foundation rings (28) and projecting upwardly through a flange portion (17') of said pump/turbine discharge ring (14); a jack-bolt (43) supported by the upper foundation ring (28) beneath the flange in a vertically adjustable position and moveable upwardly into engagement with the flange portion of the discharge ring to effect a leveling of the discharge ring (14); a threaded nut (54) engaging the end of the threaded stud (21) projecting upwardly through the flange (17') of the discharge ring (14) to capture the discharge ring between the top of the jack-bolt (43) and the anchor stud nut (54) and prestress said anchor stud (21); a plurality of vertical tubular sleeves (24) embedded in said concrete foundation structure between the foundation rings (22, 28); and a plurality of anchor bolts (23) each extending through the upper foundation ring (28), through one of said sleeves (24) between the upper and lower foundation rings (22, 28) and through the lower foundation ring (22), and means prestressing said anchor bolts, and with the sleeves (24) having an internal diameter larger than the outer diameter of the anchor bolts (23) to thereby provide for limited movement of the pump/turbine discharge ring (14) and the anchor bolts (23) relative to the sleeves (24) and the concrete foundation structure (12) without relieving the prestress applied to the discharge ring leveling anchor stud (21) and foundation ring anchor bolts (23) and further provide for level adjustment of the discharge ring (14) without relieving the prestress applied to the anchor bolts (23).

2. An apparatus according to claim 1 in which the jack-bolt (43) is supported by the upper foundation ring (28) by a jack-bolt nut (41) which threadedly engages the jack-bolt (43) and abuts the upper surface of the upper foundation ring (28), and the jack-bolt (43) is provided with a central axially extending bore of a diameter larger than the diameter of the anchor stud (21) and through which the anchor stud (21) projects to further provide for lateral movement of the discharge ring (14) relative to the upper foundation ring (28) without relieving the prestress applied to the anchor stud (21) and anchor bolts (23).

* * * * *